United States Patent [19]

Leech et al.

[11] 4,197,906

[45] Apr. 15, 1980

[54] MOUNTING CLIP FOR A TUBE SHEET

[75] Inventors: Brad G. Leech; Richmond S. Hayes, Jr., both of Fayetteville, N.Y.

[73] Assignee: Carrier Corporation, Syracuse, N.Y.

[21] Appl. No.: 889,579

[22] Filed: Mar. 23, 1978

[51] Int. Cl.$^2$ ............................................. F28F 7/00
[52] U.S. Cl. ................................... 165/76; 403/201; 151/41.75
[58] Field of Search ................................... 151/41.75; 403/186–188, 201; 165/67, 68, 80

[56] References Cited

U.S. PATENT DOCUMENTS

| | | | |
|---|---|---|---|
| 1,885,537 | 11/1932 | Murray, Jr. et al. | 165/67 X |
| 2,315,359 | 3/1943 | Tinnerman | 151/41.75 |
| 2,379,893 | 7/1945 | Ellinwood | 151/41.75 |
| 2,438,767 | 3/1948 | Shieth | 165/67 |
| 2,657,443 | 11/1953 | Hartmann | 151/41.75 |

FOREIGN PATENT DOCUMENTS 777277 6/1957 United Kingdom ................ 151/41.75

Primary Examiner—Samuel Scott
Assistant Examiner—Theophil W. Streule, Jr.
Attorney, Agent, or Firm—J. Raymond Curtin; Robert P. Hayter

[57] ABSTRACT

Apparatus for joining a sheet to a structural member angled therefrom which includes forming an indented portion in the sheet as well as a slot such that a clip having a tail section, a body section and a head section may be inserted such that the tail section extends through the slot and the head section extends beyond the end of the sheet such that the head section and the tail section are on one side of the sheet and the body section is on the same side of the sheet as the indented portion. The clip head has a screw opening such that a screw may be inserted through the member to which the sheet is to be joined into the clip head. Upon tightening the screw a support surface on the clip tail engages the sheet at the slot and the screw threads engage the interior surface of the indented portion of the sheet thereby securing the sheet to the screw and consequently the member through which the screw extends. The clip head may also have contact surfaces such that the clip body may be deformed against the indented portion of the sheet and held in a deformed stressed position by the contact surfaces thereby securing the clip to the sheet prior to the insertion of the screw. This joint has particular application for aluminum tube sheets used with aluminum heat exchangers when the tube sheets are mounted to a bracket perpendicular to the ends thereof.

10 Claims, 7 Drawing Figures

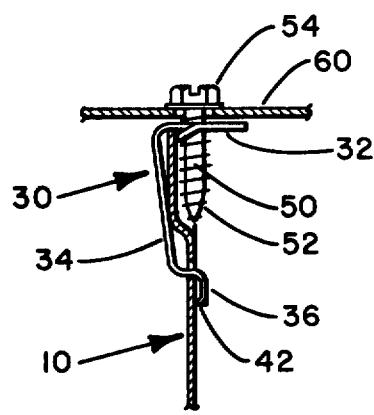
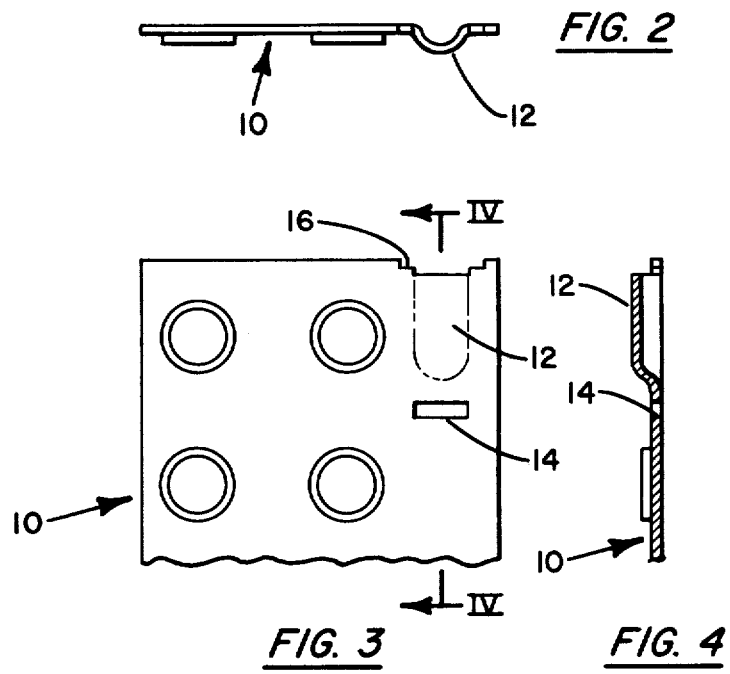
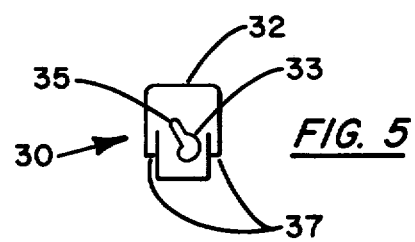
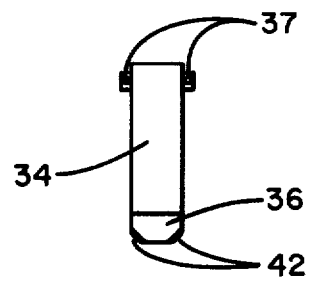
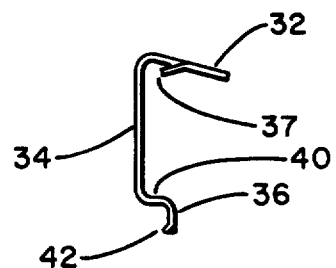

MOUNTING CLIP FOR A TUBE SHEET

BACKGROUND OF THE INVENTION

1. Field of the Invention

The present invention relates to fastening devices for joining a sheet to a member at an angle from the sheet. More specifically the present invention relates to a joint for joining a flangeless tube sheet of an aluminum heat exchanger to a perpendicular bracket for securing the heat exchanger thereto.

2. Prior Art

The present invention provides for a strong, secure and inexpensive method for joining an aluminum tube sheet without flanges to a structural support member located perpendicular to the end thereof. Previous tube sheets were manufactured from steel such that flanges were provided at the ends thereof and could be bolted directly to supporting brackets. Other methods of joining previous tube sheets included lancing the tube sheet to form a series of parallel spaced portions and then deforming these portions alternately in opposite directions to form a cavity in which a screw could be inserted such that the threads would engage these portions. It has been found that this particular lancing arrangement is not effective when used with aluminum due to the characteristics of the aluminum and the screw threads becoming dislodged.

The advent of aluminum heat exchangers with aluminum tubes and fins and the newly developed ultrasonic soldering techniques has made it necessary to develop aluminum tube sheets in order to have an entirely aluminum heat exchanger. The utilization of an aluminum tube sheet has required that new joining methods be utilized to mount the heat exchanger within the appropriate unit. The typical heat exchanger is comprised of a plurality of joined hairpin tubes having a multiplicity of fins mounted onto the hairpins such that a continuous fluid circuit is formed when the hairpins are joined together with return bends. This type of heat exchanger typically referred to as a plate fin coil has a tube sheet mounted on each end thereof to secure the fins therebetween. The refrigerant typically flows through the hairpins and return bends such that heat is transferred between the refrigerant and the air in contact with the fins and tubes.

SUMMARY OF THE INVENTION

An object of the present invention is to effectively and economically fasten a sheet to a member angled therefrom.

A more specific object of the present invention is to fasten a flangeless tube sheet to the appropriate support structure in an air conditioning unit.

An additional object of the present invention is to provide a mechanism for securing an aluminum tube sheet to a support structure without the use of the flange.

A still further object of the present invention is to provide a safe, economical, reliable, durable and easy to install apparatus for securing an aluminum tube sheet to a supporting member.

A further object of the present invention is to provide a clip that will form a flush fit at the end of the tube sheet such that the tube sheet may be secured to a mounting structure.

Another object of the present invention is to provide a method for utilizing tooling that is simple and easy to operate to manufacture the appropriate tube sheet clip to make the herein described joint.

Other objects will be apparent from the description to follow and from the appended claims.

The preceding objects are achieved according to a preferred embodiment of the invention by providing an aluminum tube sheet having an indented portion and a slot through the tube sheet located immediately below the indented portion. A clip having a clip tail and a clip head connected by a clip body is then inserted through the slot such that the clip tail extends therethrough. The clip head is then extended across the end of the tube sheet such that the clip tail and the clip head are on one side of the tube sheet and the clip body is on the other side of the tube sheet. The screw may then be inserted through the clip head such that the clip is joined to the supporting member by the screw. The screw threads act to engage the clip head such that a support surface of the clip tail engages the surface of the slot to secure the tube sheet thereto as well as the thread to the screw engaging the surface of the tube sheet in the indented portion to directly secure same. The clip body is mounted such that it engages the indented portion of the tube sheet and the clip head has contact surfaces thereon such that when the clip is inserted it may be deformed against the indented portion such that the contact surfaces may engage the opposite side of the tube sheet thereby securing the clip to the tube sheet. The combination of forces exerted as a result of the deformation of the clip body and the contact of the clip tail and clip contact surfaces with the tube sheet act to hold the clip to the sheet. The clip tail may further have points for digging into the tube surface to further secure the clip to the tube sheet.

BRIEF DESCRIPTION OF THE DRAWINGS

FIG. 1 is an end view of the tube sheet assembled to a bracket utilizing the clip and deformed tube sheet as described herein.

FIG. 2 is a top view of the tube sheet showing the indented portion.

FIG. 3 is a side view of a tube sheet pin showing the indented portion and the slot.

FIG. 4 is a sectional view of FIG. 3 taken along line IV—IV.

FIG. 5 is a top view of a clip showing the clip head.

FIG. 6 is a side view of a clip showing the clip body.

FIG. 7 is an end view of a clip showing the clip body, the clip head and the clip tail.

DESCRIPTION OF THE PREFERRED EMBODIMENT

The embodiment of the invention described below is adapted for use in an air conditioning unit for fastening a tube sheet of a heat exchanger to a supporting structure such as a bracket, wrapper, base pan, or other element of the air conditioning unit. It is to be understood that this invention finds like applicability in fastening other air conditioner components together and in general fastening a sheet to a supporting member or other member angled from the end thereof. It is further to be understood that the above invention is to be described with particular applicability to aluminum sheets but that this invention could be used with any material.

Referring now to the drawings, FIG. 2, FIG. 3 and FIG. 4 show top, side and sectional views of the tube sheet 10 wherein it can be seen that an indented portion 12 has been formed. The indented portion extends at a predetermined distance along the tube sheet and is generally arcuate in cross section. Slot 14 extends through the tube sheet and is formed immediately adjacent to indented portion 12. Set in surface 16 is provided at the top of tube sheet 10 as shown in FIG. 3 such that when the clip is inserted it extends across the tube sheet and that the height of the clip will be such that the top surface of the tube sheet will be flush from the tube sheet across the clip and back to the tube sheet.

Referring now to FIGS. 5, 6 and 7, it can be seen that the clip 30 has a clip head 32 with a screw opening 33 and a starting slot 35. The clip head further has formed from a portion thereof contact surfaces 37 which are angled below the plane of the clip head. In FIG. 6 the clip body portion 34 of the clip is shown as are the ends of contact surfaces 37. Clip tail 36 can be seen extending from the bottom of the clip and points 42 extending therefrom. In FIG. 7, and end view of clip 30, it can be seen that the clip tail portion 36 of the clip is somewhat S-shaped and that a support surface 40 is formed thereon. Points 42 and contact surfaces 37 are also clearly indicated thereon.

In FIG. 1 the assembled joint is shown. Therein it can be seen that clip tail 36 extends through slot 14 of the tube sheet such that support surface 40 contacts the interior surface of slot 14. It can also be seen that points 42 of the clip tail 36 are engaged with the surface of the tube sheet. The clip tail 36 is connected by clip body 34 to clip head 32. It can be seen that the clip body 34 engages the indented portion 12 of the tube sheet and that the clip head 32 extends from the clip body through the set in surface 16 of the tube sheet across the tube sheet. Consequently, the end of the clip tail 36 and clip head 32 are on one side of the tube sheet 10 and the clip body 34 is on the opposite side of the tube sheet 10. A screw 50 having screw head 54 and threads 52 extends through bracket plate 60 into screw opening 33 of clip head 32. It can be seen that the threads engage the screw opening 33 and that the threads 52 of the screw also engage the interior surface of the indented portion 12 of the tube sheet. The combination of these two engagements acts to secure the clip tube sheet to the bracket 60. It can further be seen in FIG. 1 that the contact surfaces 37 are not engaged to the tube sheet 12. When clip 30 is inserted the tail is inserted first through the slot 14 and the head section 32 is then snapped across the tube sheet such that it is located within set in surface 16, the clip body portion 34 engages the indented portion 12 such that an internal stress is created in the clip body. At this point in time, (not shown) the contact surfaces 37 engage the opposite side of tube sheet 12 from clip body 34 such that the clip is secured to the tube sheet prior to the insertion of the screw. The insertion of the screw acts to further deform the clip displacing the contact surfaces away from the surface of the tube sheet.

It is evident from the above description of the preferred embodiment that the apparatus described herein provides an inexpensive, simple and easy to assemble means of fastening a tube sheet to a bracket within an air conditioning system. The utilization of this type of clip allows the use of a clip made from a material such as steel wherein hardened thread holes may be utilized for longer life usage and higher torque limits. This clip as shown also has a starting slot 35 such that the entry of the screw into the screw opening is made easier. Additionally the screw opening 33 may be so inclined that a locking feature is provided to prevent the screw inserted therein from backing out on its own accord. Furthermore tooling to pierce a notched tube sheet is readily providable as it is tooling to manufacture this clip as described.

The invention has been described in detail with particular reference to a preferred embodiment thereof, but it will be understood that variations and modifications can be effected within the spirit and the scope of the invention.

What is claimed is:

1. A joint including:
   a tube sheet having an indented portion extending from the edge thereof and a slot located in proximity to the indented portion;
   a clip having a clip head connected to a clip tail by a clip body, said clip tail extending through the slot such that a support surface of the tail engages a surface of the sheet at the slot, said clip body extending from the clip tail on the side of the sheet to which the indented portion extends to the clip head, the clip head extending across the end of the tube sheet and having a screw opening therein;
   a plate angled from the sheet to which the sheet is to be connected; and
   a screw extending through the member into the screw opening of the clip whereby upon the screw being tightened, the screw threads engage the clip and consequently the sheet through the support surface of the clip tail and the screw threads further engage the surface of the tube sheet at the indented portions to secure the sheets to the member.

2. The apparatus as set forth in claim 1 wherein the clip body engages the indented portion of the tube sheet and further including contact surfaces projecting from the clip head such that the clip may be secured to the sheet by inserting the clip tail through the slot and then deforming the clip body against the indented portion allowing the contact surfaces to engage the sheet on the opposite side from the indented portion whereby the internal stress created within the clip body by the deformation thereof secures the clip to the sheet.

3. The apparatus as set forth in claim 2 and further including the clip tail having points to engage the sheet to further secure the joint.

4. The apparatus as set forth in claim 1 wherein the sheet has a set in slot such that the clip head extending across the sheet is within the set in slot and consequently is flush with the end of the sheet.

5. The apparatus as set forth in claim 1 wherein the sheet is aluminum.

6. In an air conditioning unit having a heat exchanger and a bracket angled from the heat exchanger to which the heat exchanger is connected, said heat exchanger having a tube sheet with an indented portion extending from the edge thereof and a slot located in proximity to the indented portion, means for securing the tube sheet to the bracket including a clip having a clip head connected to a clip tail by a clip body, said clip tail extending through the slot such that a support surface of the tail engages the surface of the sheet at the slot, said clip body extending from the clip tail on the side of the sheet to which the indented portion extends to the clip head, said clip head extending across the end of the tube sheet and having a screw opening therein, and a screw extending through the bracket into the screw opening of the clip wherein upon the screw being tightened the screw threads engage the clip and consequently the tube sheet through the support surface of the clip tail and the screw threads also engage the surface of the tube sheet at the indented portion to thereby secure the tube sheet to the bracket.

7. The apparatus as set forth in claim 6 wherein the clip body engages the indented portion of the tube sheet and further including contact surfaces projecting from the clip head such that the clip may be secured to the tube sheet by inserting the clip tail through the slot and then deforming the clip body against the indented portion allowing the contact surfaces to engage the tube sheet in the opposite side of the indented portion whereby the internal stresses within the clip body created by the deformation secure the clip to the tube sheet.

8. The apparatus as set forth in claim 6 and further including the clip tail having points to engage the tube sheet to further secure the joint.

9. The apparatus as set forth in claim 6 wherein the tube sheet has a set in slot such that the clip head extending across the sheet is within the set in slot consequently being flush with the end of the tube sheet.

10. The apparatus as set forth in claim 6 wherein the tube sheet is aluminum.

* * * * *